UNITED STATES PATENT OFFICE.

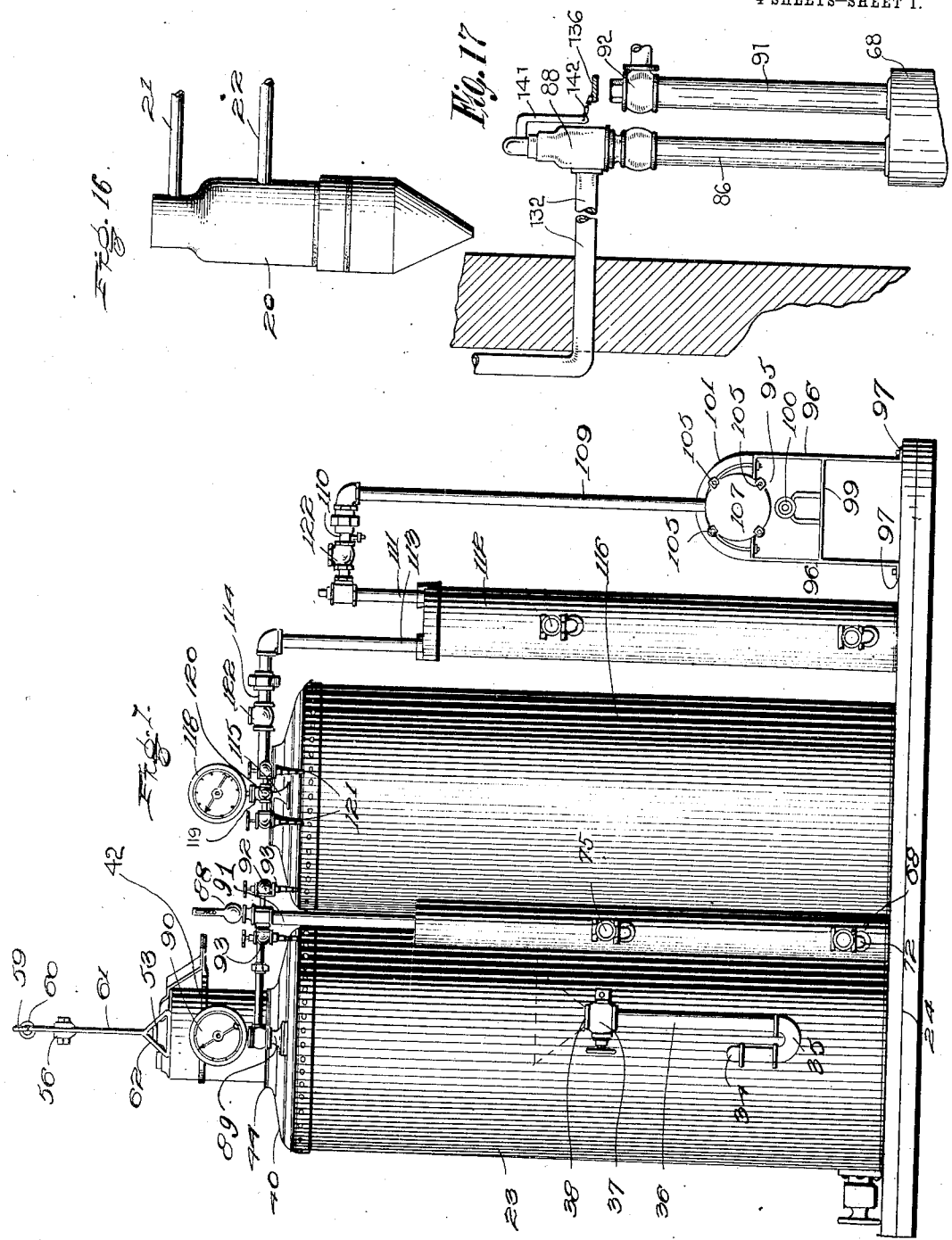

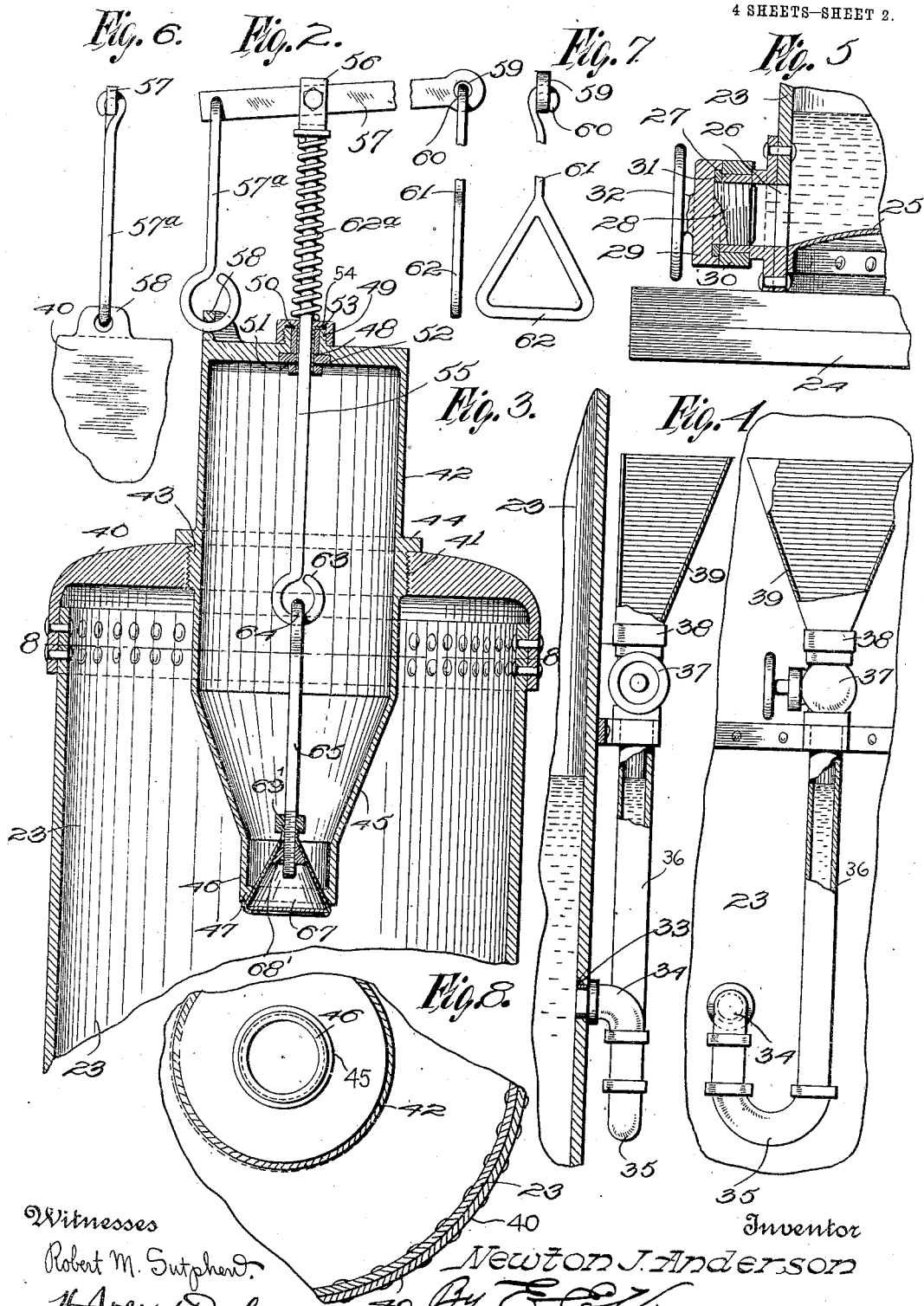

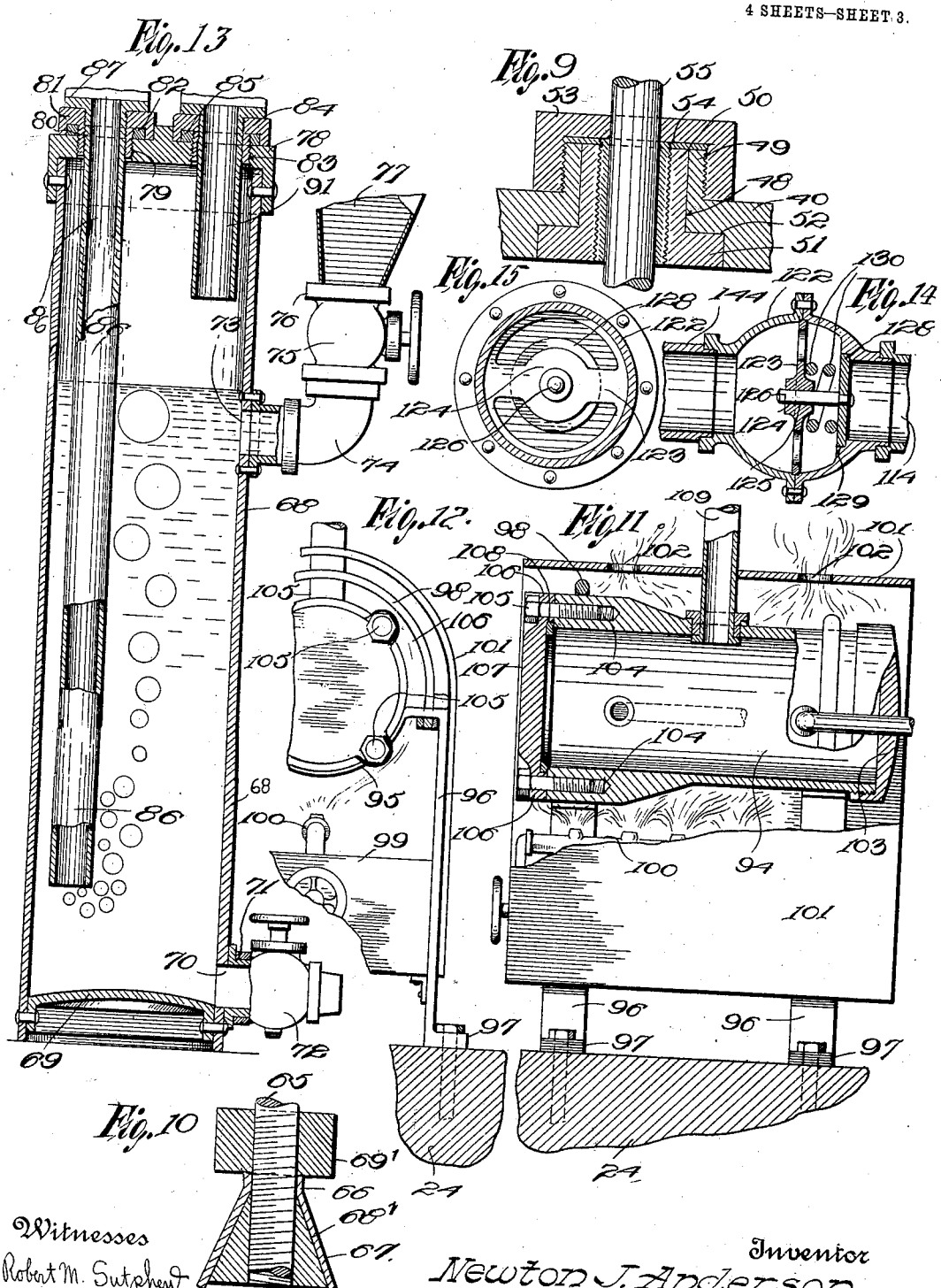

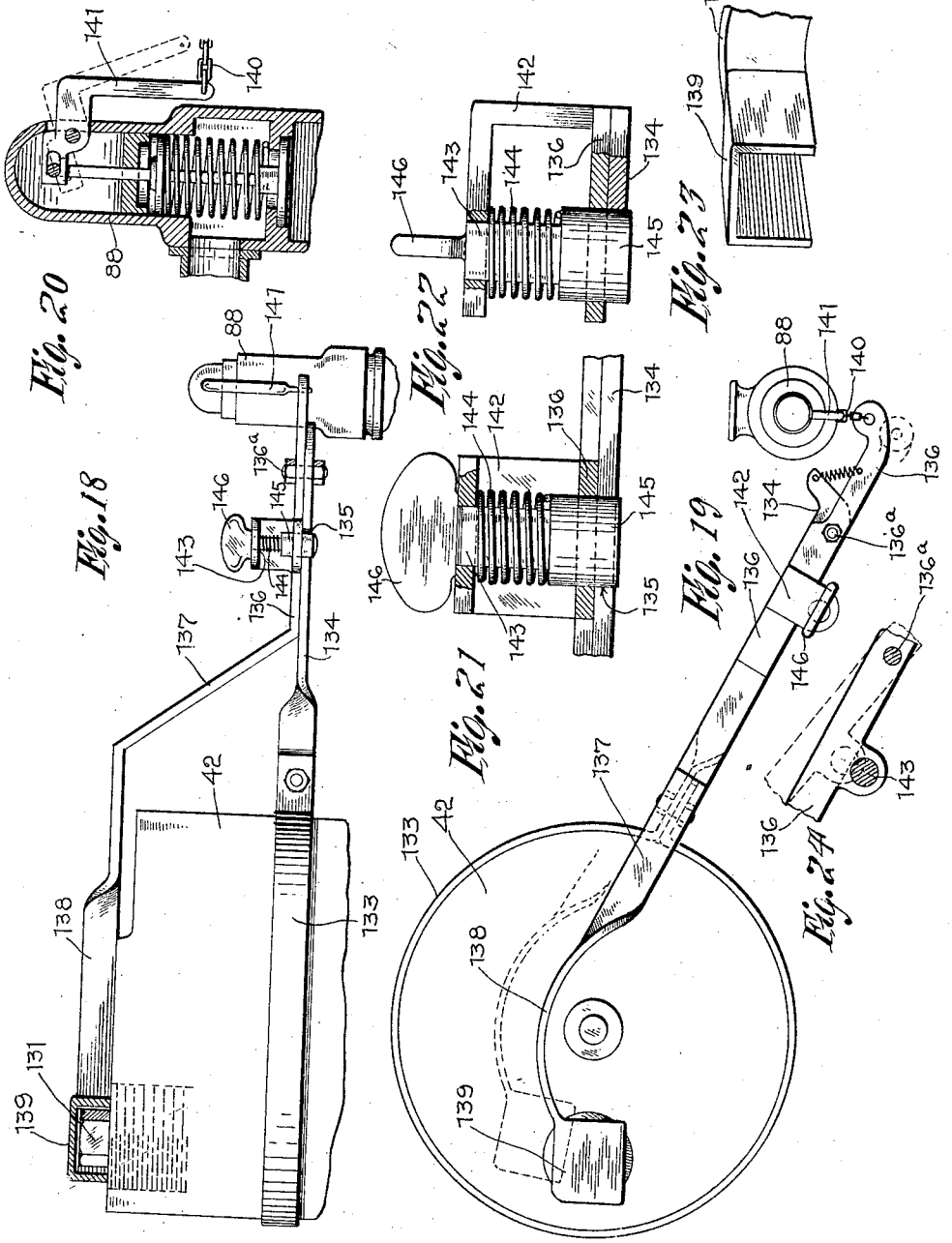

NEWTON J. ANDERSON, OF COFFEYVILLE, KANSAS, ASSIGNOR TO THE ANDERSON MANUFACTURING COMPANY, OF TULSA, OKLAHOMA.

WELDING PLANT.

1,047,140.

Specification of Letters Patent.   Patented Dec. 17, 1912.

Application filed January 27, 1911.   Serial No. 605,091.

*To all whom it may concern:*

Be it known that I, NEWTON J. ANDERSON, a citizen of the United States of America, residing at Coffeyville, in the county of Montgomery and State of Kansas, have invented certain new and useful Improvements in Welding Plants, of which the following is a specification, reference being had therein to the accompanying drawing.

This invention relates to the subject of producing gaseous fuels for use in connection with welding and other tools, and the principal object of the same is to provide a producing plant in which acetylene gas and oxygen can be cheaply, rapidly and safely generated and delivered to a welding or other tool to be mixed and thereby form the heating fuel for the tool.

In carrying out the objects of the invention generally stated above, it will be understood, of course, that the essential features of the same are necessarily susceptible of changes in details and structural arrangements, one preferred and practical embodiment of which is shown in the accompanying drawings, wherein:—

Figure 1 is a view in elevation of the improved fuel generating plant. Fig. 2 is a fragmentary vertical sectional view of the acetylene generator. Figs. 3 and 4 are fragmentary sectional views showing in detail the manner of supplying water to the acetylene generator. Fig. 5 is a similar view showing a valve-controlled clean-out opening in the acetylene generator. Figs. 6 and 7 are fragmentary views in detail of parts of the carbid feeding mechanism. Fig. 8 is a fragmentary transverse sectional view taken on the line 8—8, Fig. 2, the valve and stem being omitted. Fig. 9 is a detail sectional view of a stuffing box for the stem of the carbid feed controlling valve. Fig. 10 is a similar view of the controlling valve. Fig. 11 is a side elevation partly in section of the oxygen producing retort. Fig. 12 is a fragmentary end elevation of said retort. Fig. 13 is a vertical section through one of the fuel washers. Figs. 14 and 15 are, respectively, longitudinal and transverse sections showing one of the check valves used in the fuel pipes. Fig. 16 is a detail view of a certain torch used in connection with this invention. Fig. 17 is a detail of certain parts of the safety device used in connection with the acetylene generator. Fig. 18 is a side elevation partly in section of such a safety device. Fig. 19 is a plan view of the safety device. Fig. 20 is a section through a valve used in connection with the safety device. Fig. 21 is a detail view partly in section of a certain stop pin and its housing. Fig. 22 is a similar view to Fig. 21 but taken at right angles thereto. Fig. 23 is a detail perspective of a cap used in connection with the safety device. Fig. 24 is a horizontal section through the stop pin showing a portion of the arm of the safety device.

The improved fuel generating plant is of special utility in the production of acetylene gas and oxygen for use in connection with the type of welding torches shown in Fig. 18 of the accompanying drawings, and which forms the subject-matter of Letters Patent No. 976,717 granted to me November 22, 1910. Said torch, which is designated generally by the numeral 20 is provided with an internal chamber to which oxygen and acetylene pipes 21 and 22, respectively, deliver the fuel, and said fuel is intimately mixed in said chamber and discharges from and is ignited at the burner end of said torch. The torch 20 is shown as one of the many types of tools which may be used in connection with this invention, and it is to be understood, of course, that this invention is not to be limited to use in connection with any tool.

The improved fuel producing plant comprises an acetylene tank 23 that is rigidly secured to a platform 24, said tank being preferably cylindrical and having a raised bottom 25. At its lower portion, the tank 23 is provided with a clean-out opening 26 from which an internally-threaded tube 27 projects laterally. An externally-threaded plug 28 is employed for sealing tube 27 and said plug carries a flanged cap 29 that fits snugly over the outer end of tube 27 and abuts an external annular shoulder 30 carried by said tube. A gasket 31 is interposed between said cap 29 and the outer end of tube 27 and to facilitate the necessary manipulation of the plug 28, to seat or unseat the same, the cap 29 thereof is equipped with a hand grip 32, preferably in the form of a wheel. At an intermediate point, the tank 23 is provided with an opening 33 from which an elbow 34 projects outwardly. Said elbow 34 carries a trap 35 which forms a liquid seal to prevent air entering the tank 23, and from said trap, a vertically-arranged pipe 36 projects, the upper end of which carries a valve casing 37. The valve casing 37 has its inlet end provided with a coupling sleeve 38 into which a funnel 39 projects for the charging of tank 23 with water. As will be obvious, the funnel 39 is but one of the many ways in which water can be poured into pipe 36 for the coupling sleeve 38 is capable of being used in connection with any type of tubular water-conveying devices.

A flanged cover 40 is rigidly fastened in overlapping gas-tight relation to the upper edge of the tank 23, and said cover is provided with a central, internally-threaded opening 41. A carbid receptacle 42 is provided with an external circumferential threaded portion 43 for engaging the threaded opening 41 of cover 40, and also with an outstanding annular flange 44 to overlap and seal the joint between the threads of said opening and receptacle gas-tight. The receptacle 42 has its lower portion projecting well into the tank 23 and terminates in a conical neck 45 provided with a discharge tube 46, the base of which carries an inwardly-projecting annular valve seat 47 that is beveled. The upper end of receptacle 42 projects well above the cover 40. The receptacle 42 is provided with a central opening 48 and this opening also extends through a boss 49 which is externally threaded. A packing gland or stuffing box 50 is fitted in opening 48 and tube 49. Said gland is provided with a gasket 51 that is seated in a recess 52 at the inner end of opening 48. An internally-threaded cap 53 engages the threads of tube 49 and is provided with a central opening that alines with the opening through said tube. A gasket 54 is interposed between cap 53 and tube 49. An operating rod 55 is slidable through gland 50 and cap 53 and has its projected upper end provided with a bifurcated head 56 in which a rocking lever 57 is pivotally mounted. One end of lever 57 has a pivotal link connection 57ª with an upstanding ear 58 carried by the outer end of carbid receptacle 42. The other end of said lever is provided with an eye 59 that is engaged by an end hook 60 of a handle 61 that is preferably formed with a substantially triangular handgrip 62. A spring 62ª is coiled about rod 55, one end thereof bearing on head 56 and the other end bearing on cap 53 so that said rod 55 is normally retained in an outwardly-projected position. The lower end of rod 55 is within receptacle 42 and terminates in an eye 63, that has a swiveled engagement with an eye 64 of a valve stem 65. The lower end of stem 65 is threaded and projects through the neck 66 of a hollow conical valve 67 that has its upper end provided with a head block 68' which said stem engages. A lock nut 69' is employed for clamping neck 66 to the stem 65.

As is clearly shown in Fig. 2, the valve 67 is normally held to seat 47 by the tension of spring 62ª, and it will be clear that when carbid is to be fed from receptacle 42 to the water in the tank 23, said valve 67 is forced from its seat by pulling down on handle 61, and when said handle is released, the spring 62ª automatically restores the valve to its seat so that the outlet end of receptacle 42 will be sealed. It will also be seen that the described manner of flexibly connecting the rod 55 to the valve stem 65, permits the valve stem to have rocking movements relative to said rod so that the rocking movements of the valve stem incidental to the operations of the valve will not cause the rod 55 to bind in the stuffing box.

A cylindrical washing tank 68 is rigidly fastened to platform 24 and is arranged vertically and in proximity to the acetylene tank 23. The tank 68 is preferably smaller in diameter and of less length than the tank 23 and is provided with a raised bottom 69. At the lower portion, tank 68 is provided with a clean-out opening 70 from which a tube 71 projects that is provided with a controlling valve 72. At an intermediate point, tank 68 is provided with an opening 73 from which a filling pipe 74 projects. The upper end of pipe 74 is provided with a controlling valve 75, the casing of which is equipped with a coupling sleeve 76 in which a funnel 77 or other means that will facilitate the passage of water is seated. A flange cover 78 is fitted gas-tight over the upper end of tank 68 and is provided with a threaded opening 79. An externally threaded sleeve 80 is fitted in opening 79 and is provided with a flanged outer end 81, between which and the cover 78 a sealing gasket 82 is interposed. The cover 78 is provided with another opening 83 that is equipped with a flange sleeve 84 and gasket 85 which are similar in all respects to the opening 79, sleeve 80, flange 81 and gasket 82. An externally threaded inlet pipe 86 projects through sleeve 80 and its lower end terminates adjacent the bottom of tank 68. The outer portion of pipe 86 is provided with a sealing flange 87 that rests on the end flange 81 of said pipe 86. Pipe 86 has its upper end coupled to the casing of a safety valve 88. A discharge tube 89 projects from the cover 40 of tank 23 and a pressure gage 90 is carried by tube 89. A discharge pipe 91 extends through the cover of tank 68. Said pipe 91 has its lower end arranged above the water level in tank 68 and its upper end, which projects above the top of tank 68, has pipe connections 92 with valve controlled outlets 93 which are adapted to have hose or other flexible connections with the acetylene inlet pipe or pipes for welding tools, such as pipe 22 of the torch 20.

As is clearly illustrated in Fig. 14, the acetylene gas is delivered into the tank 68 below the water level thereof and flows through the water and leaves the tank through pipe 91, thereby providing simple means for thoroughly washing the gas.

From the foregoing description, it will be seen that this invention provides simple manually-operable means for feeding the carbid to the tank 23 to generate the gas and also simple means whereby the gas is thoroughly washed before being delivered to the welding tool.

As has been stated before, the improved fuel producing plant includes means for producing oxygen as well as acetylene gas, so that the oxygen and acetylene can be separately delivered to the welding tool and intimately mixed in said tool. The oxygen producer forming a part of this invention will now be described.

The oxygen is generated in a cylindrical retort 94 that is horizontally supported in the concaved seats 95 carried by the arched legs 96 which have their flat bases 97 rigidly fastened to the platform 24. Tie bars 98 encircle the retort 94 and rigidly fasten the same to the seats 95. Transverse bars 99 connect the legs 96 and serve as supports to retain the burners 100, or other source of heat, beneath the retort 94. A hood 101 incloses the retort and the source of heat in spaced relation and is provided with upper openings 102 for the escape of the products of combustion. The rear end of the retort is externally threaded and an internally threaded flanged cap 103 is employed for sealing said rear end. The forward end of the retort 94 has its edge provided with longitudinally-extending threaded openings 104 which are engaged by the bolts 105 that pass through the flange 106 of a cover plate 107 to cause said plate to seal the forward end of the retort. A gasket 108 is interposed between the flange 106 and the forward end of the retort. Retort 94 is provided with a discharge pipe 109 that is fitted gas-tight in its upper portion. Pipe 109 projects through and above hood 101 and its upper end is suitably coupled to a connecting pipe 110 which is in turn coupled to the inlet pipe 111 that enters a washing tank 112 through the top thereof. It is to be noted that this retort is to be charged with some material capable of producing oxygen when heat is applied thereto as for instance potassium chlorate ($KClO_3$) which, when heated, decomposes into potassium chlorid and oxygen ($KCl + 3O$). Tank 112 is preferably the same in construction as tank 68 and the discharge pipe 113 of tank 112 is suitably coupled to a connecting pipe 114 which in turn is coupled to an inlet tube 115 of a storage tank 116. The storage tank 116 is preferably the same in size and shape as the tank 23. A pressure gage 118 is carried by tube 115, and the cover of tank 116 is provided with a discharge tube 119 from which the pipes 120 project and which carry valve-controlled outlets 121 which are adapted for hose or other flexible connections with the oxygen pipe or pipes 22, such as is shown in connection with the torch 20.

The pipes 111 and 114 are preferably equipped with check valves for preventing back flow of the fuel. The type of valve employed is shown in detail in Figs. 15 and 16, and by referring thereto it will be seen that said valve comprises a casing 122 provided with a central, transversely-arranged perforated partition 123. Said partition is provided with a reinforced central portion 124 having a guide opening 125 formed through it. A valve stem 126 is slidable through opening 125 and carries a disk, or other type of valve 128 adapted to engage a seat 129 in the inlet end of casing 122. A spring 130 is coiled about stem 126, one end thereof bearing against the valve 128 and the other end bearing against the center of the partition 123. As will be obvious, the tension of spring 130 is being constantly exerted to retain the valve 128 to its seat 129, but the pressure of the incoming oxygen is sufficient to overcome the tension of spring 130 so that the valve is retained open and the oxygen flows through the casing 122. In the event of a back-flow of the oxygen, it will be clear that said valve will be quickly seated and thereby seal the inlet end of the casing 122.

The carbid receptacle 42 is provided with a filling opening that is normally sealed by a plug 131. The head of the plug is preferably nut-shaped. In connection with the plug 131 which controls the charging of the receptacle 42, the invention provides means whereby the safety valve 88 is operated if an attempt is made to remove the said plug so that the gas will be conveyed through a pipe 132 to a distance from the plant so that danger of an explosion being caused by gas escaping through the filling opening of the receptacle 42 is avoided. This safety device comprises a band 133 that encircles the receptacle 42 and carries a laterally-projecting supporting arm 134, one longitudinal edge of which is provided with a recess 135. A valve operating rod 136 has a pivotal connection 136ª with the free end portion of arm 134. Rod 136 has an upwardly-projecting portion 137 from which an arm 138 projects over the top of receptacle 42 and has its other end provided with a cap 139 that is open at one end. Cap 139 normally incloses the nut-shaped head of plug 131 so that in order to remove said plug, it will be necessary to rock rod 136 on its pivotal connection with arm 134 so that cap 139 will uncover said plug. The free end of rod 136 has a chain or other flexible connection 140 with the operating lever 141 of valve 88. Rod 136 carries a laterally-projecting lock housing 142 through which a bolt 143 is slidable. A spring 144 is coiled about the said bolt and bears against the enlarged portion 145 thereof and the upper portion of the casing with sufficient tension to normally project the lower portion of the bolt below the base of the housing so that said bolt will engage the recess 135 of arm 134 to lock the rod 136 to said arm. Said bolt 143 is provided with a hand grip 146 by means of which said bolt may be manually removed from recess 135 to release rod 136.

By employing the described safety device, it will be seen that before plug 131 can be removed from the filling opening, rod 136 must be released from arm 134 and then swung on its pivotal connection with said arm to remove cap 139 from said plug, and said rod 136 being connected to the operating lever of the safety valve 88, it will be clear that the swinging movement of said rod will cause said lever to open the said valve so that the gas will pass out of the tank 23 and be conveyed to a distant point by pipe 132 before the plug 131 can be removed.

In this application the oxygen and gas generators are not specifically claimed for the reason that the same are to form the subject-matter of separate applications. Said applications are: acetylene generator filed May 13th, 1911, Serial No. 627,018; and oxygen generator filed May 13th, 1911, Serial No. 627,016.

What I claim as my invention is:—

In combination with a welding tool provided with an oxygen inlet and an acetylene inlet; an oxy-acetylene generating plant comprising an oxygen generator, a washer, a pipe connection between said generator and washer, opening to permit a flow of gas to said washer, a storage tank, a pipe connection between said storage tank and washer, a pressure gage thereon, a discharge pipe leading from said tank, a delivery nozzle adapted for hose connection with said tool on the last mentioned pipe, an acetylene generator, an acetylene washer, a pipe connection between the generator and washer, a safety valve in the last-mentioned pipe connection, a safety pipe leading from said safety valve to a point remote from said generator, said generator being provided with carbid charging opening, a closure for said opening, means to operate the safety valve covering said closure, check valves in the aforesaid pipe connections to prevent flash back, a pressure gage on the last mentioned pipe connection, a pipe leading from said acetylene washer, and a valve carried by said last-mentioned pipe, said pipe being provided with means adapted for connection to a hose to connect said welding tool.

In testimony whereof I hereunto affix my signature in presence of two witnesses.

NEWTON J. ANDERSON.

Witnesses:
F. E. PARENT,
FRANK E. WHITSEL.